C. H. GARDINER.
DISK CULTIVATOR ATTACHMENT.
APPLICATION FILED FEB. 7, 1917.
1,238,998.
Patented Sept. 4, 1917.
2 SHEETS—SHEET 1.
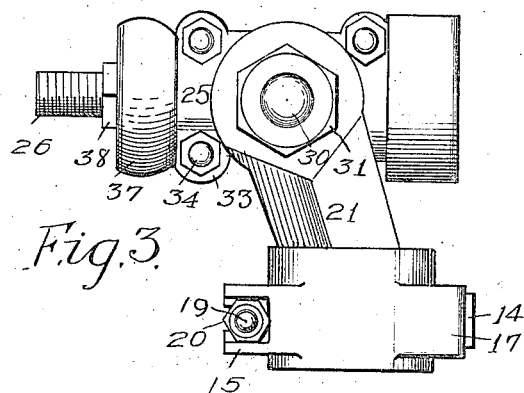
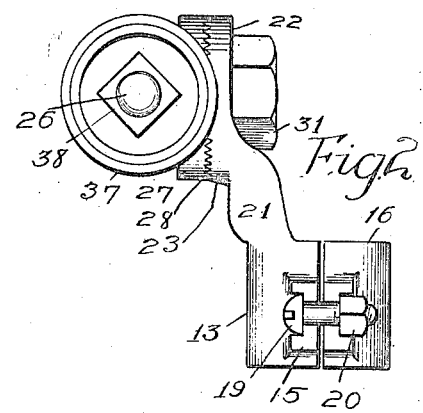
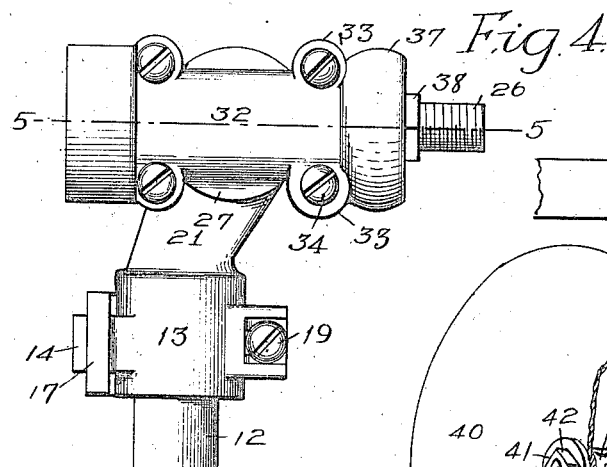
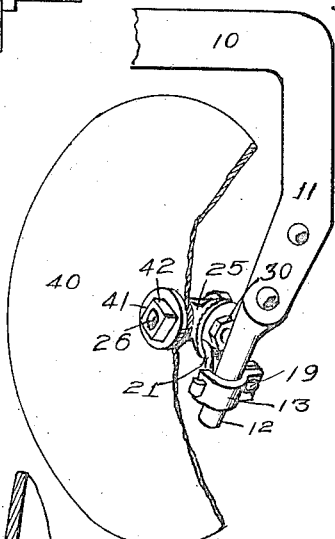
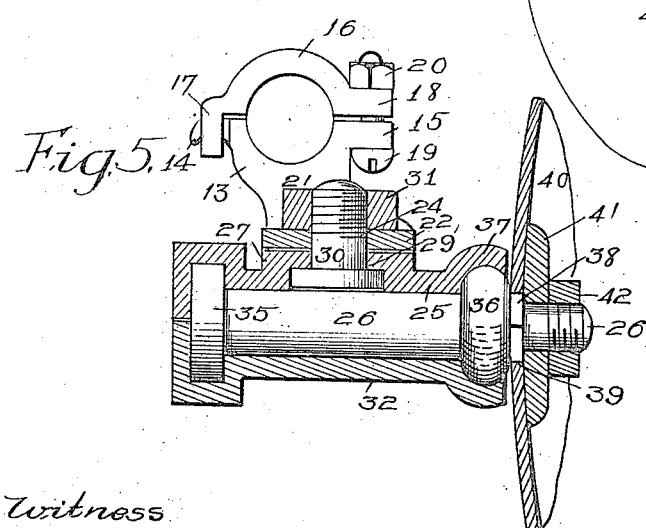
Witness
A. G. Hague.
Inventor
C. H. Gardiner
by Orwig & Bain
attys

C. H. GARDINER.
DISK CULTIVATOR ATTACHMENT.
APPLICATION FILED FEB. 7, 1917.

1,238,998.

Patented Sept. 4, 1917.
2 SHEETS—SHEET 2.

Witness
A. G. Hague

Inventor
C. H. Gardiner
by Orwig & Bair Attys

UNITED STATES PATENT OFFICE.

CHARLES H. GARDINER, OF BOUTON, IOWA.

DISK CULTIVATOR ATTACHMENT.

1,238,998.   Specification of Letters Patent.   Patented Sept. 4, 1917.

Application filed February 7, 1917. Serial No. 147,234.

*To all whom it may concern:*

Be it known that I, CHARLES H. GARDINER, a citizen of the United States, and resident of Bouton, in the county of Dallas and State of Iowa, have invented a certain new and useful Disk Cultivator Attachment, of which the following is a specification.

The object of my invention is to provide a disk cultivator attachment of simple, durable and inexpensive construction, whereby easy and accurate adjustment of the disk blades may be had.

A further object is to provide such an attachment so constructed and arranged as to be readily and easily attached on an ordinary cultivator.

A further object is to provide a disk attachment for cultivators so constructed and arranged that a disk may be mounted on the cultivator shank nearest the row of plants, so that a considerable amount of dirt may be moved without cutting deep enough to injure the young plants.

A further object is to provide such an attachment, so constructed and arranged as to permit the tilting of the disk to different positions with relation to the vertical position, and also to permit the shifting of the disk horizontally to make it cut at an angle to the path of travel of the machine, which attachment is also so constructed that the disk may be mounted close to the shank for securing the proper clearance between the disk and the nearest shovel.

A further object is to provide such an attachment adapted for mounting the disk on a cultivator beam for properly cultivating listed corn.

My invention consists in the construction, arrangement and combination of the various parts of the device whereby the objects contemplated are attained, as hereinafter more fully set forth, pointed out in my claim and illustrated in the accompanying drawings, in which:

Figure 1 shows a side elevation of one of the shanks of a cultivator with my improved attachment mounted thereon, the disk on the attachment being partially broken away for better illustration of the parts.

Fig. 2 shows a side elevation of the attachment.

Fig. 3 shows a rear elevation of the same.

Fig. 4 shows a front elevation of the same.

Fig. 5 shows a detail, sectional view taken on the line 5—5 of Fig. 4.

Figure 7:
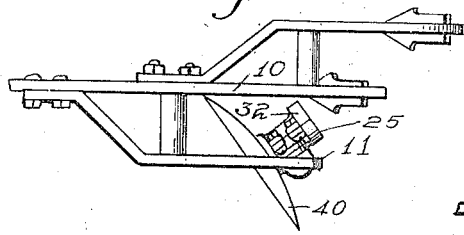
Fig. 7 shows a top or plan view of one of the gangs of a cultivator, with the disk adjusted in position for cultivating corn planted in the ordinary way with a check row planter.
Figure 8:
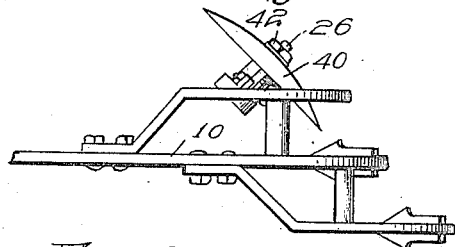
Fig. 8, shows a similar view of the opposite gang with the disk adjusted in another position.
Figure 6:
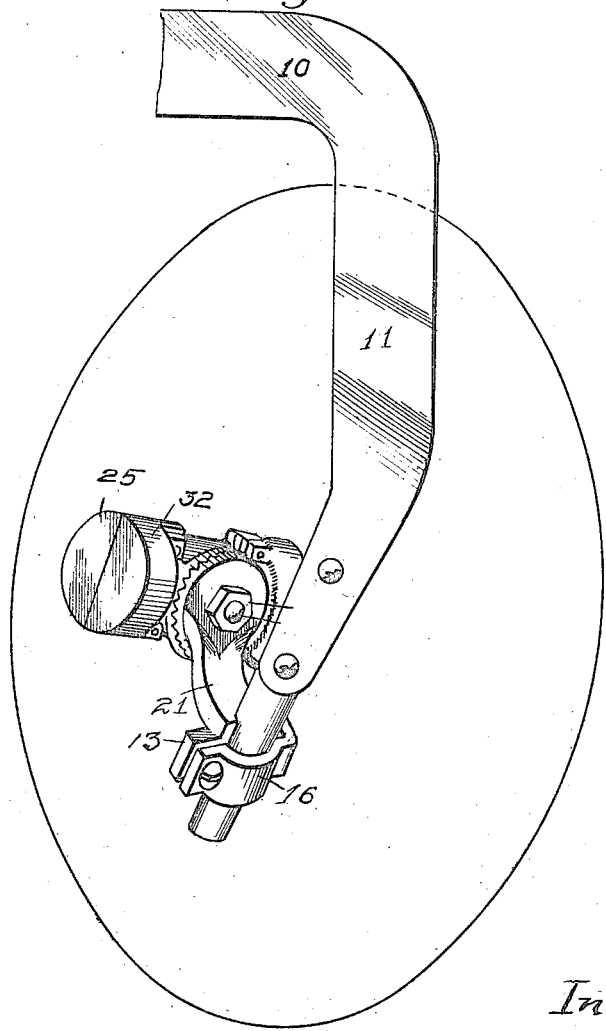
Fig. 6 shows a side elevation of a cultivator shank with my improved attachment thereon, showing the device in one of the adjusted positions of the disk.

In the accompanying drawings, I have used the reference numeral 10 to indicate generally the shovel beam of a cultivator having the downwardly extending portion 11, at the lower end of which is the comparatively short cylindrical shank 12, inclined forwardly as shown, on which the shovels or disks or other cultivating tools are mounted.

My improved attachment comprises a bearing or body 13 forming part of a clamp member, having on one side a lug 14, and on the opposite side a bifurcated flange 15. Coacting with and arranged opposite to the clamp member 13 is a clamp member 16 having at one side a loop 17 and having at the other side a bifurcated flange 18.

The clamp members 13 and 16 are designed to be mounted on or receive between them the cylindrical shank member 12, as shown in Fig. 1, with the member 14 received in the loop 17, and with a bolt 19 and nut 20 arranged to lock together the bifurcated flanges 15 and 18, as shown in said figure.

I will now describe one of my attachments in its position when applied to the inner forward shank of the right-hand gang in a cultivator, for plowing corn planted in rows and cross rows in the ordinary way.

On one of the clamp members is an arm 21, which when the parts are installed on the shank member 12, as above described, in one position thereof, extends upwardly and away from the shank and laterally in the machine. In Fig. 2, it will be seen that the arm 21 extends away from the shank and in Fig. 3 that it is also inclined laterally. It might be said that the arm 21 is inclined away from the perpendicular in two directions. The arrangement of the arm 21 is of considerable importance. It will, of course, be understood that the position of the arm 21 with relation to the shank members 11 and 12 will vary according to the position of the clamp members on the shank 12. The clamp members may be rotated around said shank to a great variety of positions, and may also to a certain extent be adjusted longitudinally on said shank.

Formed at the upper end of the arm 21 is a disk 22 having a serrated or corrugated face 23, and having extended through it a central opening 24.

Connected with the disk is the following bearing device for the disk shaft.

A journal member 25 is designed to receive one-half of a disk shaft 26, and is provided with a disk-shaped portion 27, having a corrugated face 28, designed to be adjacent to the face 23.

Extended through the journal member 25, and through the central portion of the disk-shaped portion 27 is an opening 29 to receive a bolt 30, the head of which is countersunk in the interior of the journal member 25 so as not to interfere with the rotation of the shaft 26. The bolt 30 is screw-threaded and is inserted through the opening 24 in the disk member 22 and receives a nut 31, by the adjustment of which the faces 28 and 23 may be locked together. It will be seen that by the rotation of the disk-shaped member 27 with relation to the disk-shaped member 22, adjustment of the journal for the shaft 26 may be had and this adjustment will be hereinafter more fully referred to.

Arranged to coact with the journal member 25 is a journal member 32. The journal members 25 and 32 are provided with opposite flanges 33 adapted to receive bolts 34, whereby the said journal members may be locked together for forming a proper bearing for the disk shaft.

The disk shaft 26 is provided at one end with an annular flange 35, and the journals 25 and 26 are provided with suitable recesses to receive said flange for permitting rotation thereof.

At the opposite end of the journals 25 and 32 the shaft 26 is provided with an annular rib 36, and the journals 25 and 32 are formed with suitable portions 37 to rotatably receive said rib.

The outer portion of the rib 36 is preferably arranged flush with the ends of the journals 25 and 32, as shown in Fig. 5, and the shaft 26 just outside the rib 36 is provided with an angular portion 38 designed to be received in an angular opening 39 in the disk 40.

The disk 40 is mounted on the shaft 26 with its convex portion adjacent to the rib 36. A suitable washer 41 is mounted on the shaft 26 against the concave surface of the disk. The outer end of the shaft is screw-threaded to receive a nut 42, whereby the washer 41 is held in position, so that the disk is firmly and rigidly mounted on the shaft.

In the explanation of the practical operation and advantages of my improved attachment, I would first call attention to the problem involved in mounting the disk on an ordinary cultivator shank.

It is one of my purposes to provide an attachment, whereby a disk can be mounted on a cultivator shank to which the shovels are ordinarily attached. These shanks in the greater number of cultivators are not arranged in vertical position, but are usually inclined forwardly from the vertical, as shown in Fig. 1.

This makes it necessary to mount a horizontal bearing or journal on the inclined shank member 12. It is also desirable that an attachment of this kind be adjustable for varying the tilt of the disk and its inclination away from the path of travel of the machine, and its distance from the next nearest cultivator shovel.

Thus it will be seen that the parts may be adjusted to the position shown in Figs. 1 and 2, where the disk is mounted on the forward inner shank of the right hand gang of said shanks, the arm 21 being inclined from the shank upwardly and toward the right-hand corner of the machine and being inclined also toward the rear right-hand corner of the machine. With this arrangement, the convex face of the disk is set close to the shank for adjusting the disk the proper distance from the next outer shovel.

The device for the opposite side of the cultivator is similarly arranged, with the exception that the arm 21 is extended upwardly and toward the left forward corner of the machine, and is inclined also toward the left rear corner of the machine. It will readily be seen that by rotating the clamp members around the shank, the cut of the disk may be varied and regulated by causing the disk to drag across the path of travel of the machine. It is also obvious that by adjusting the face 27 rotatably with relation to the face 23, the disk may be tilted to different angles with relation to the ground causing it to cut deeply or to scrape over the ground.

It will be seen that by turning the disk bearing over from its position shown in Fig. 1, the disk can be locked on the opposite side of the shank. By reversing the attachment and placing the right-hand attachment, as shown in Fig. 1, on the left side of the cultivator, the arm 21 may be made to extend upwardly where it will also be inclined toward the right-hand corner of the machine. The bearing for the disk shaft is then turned over with a half revolution, so that the spindle, instead of being inclined forward and toward the front left-hand corner of the machine is extended rearwardly and toward the rear right-hand corner of the machine, and the disk may be reversed, so that its concave face is adjacent to the shank, whereupon the disk can be properly spaced from the shank for cultivating listed corn or any other desired purpose.

It will be seen that with my device a vast variety of adjustments may be secured for different agricultural operations.

Thus the rotation of the clamp members on the shank member 12 varies the position of the disk with relation to the path of travel of the machine.

It will be seen, however, that on account of the inclined position of the shank, whenever the clamp members are rotated around the shank, the position of the disk with relation to upright position will be varied. It is, therefore, necessary for some adjustment other than the longitudinal adjustment of the shank 12 and the rotary adjustment thereof. I have, therefore, provided the disk-shaped members capable of adjustment with relation to each other, so that when the clamp members are rotated, the shank for varying the position of the disk with relation to the path of travel of the machine, for thereby making a narrower or wider cut and throwing more or less dirt, the disk-shaped members may be adjusted for retaining the disk 40 in its proper upright position or any proper position with relation to upright position.

I believe that in this arrangement whereby the disk may be mounted on an inclined shank in such a way as to permit its adjustment up and down on the shank, its adjustment around the shank and its adjustment with relation to upright position in all of positions of its adjustment around the shank, I have solved an important problem in cultivator constructions.

In this connection I believe the arrangement of the shaft 26 with the angular portion 38 and the other features whereby the disk is firmly and rigidly mounted on the shaft is an improvement in the art.

It will be noted that it is desirable to have the arm 21 extending upwardly in order to permit the use of a disk of considerable diameter and that when such an arm is used, another problem of adjustment is raised, namely, the problem of adjusting the disk with relation to upright position.

Some changes may be made in the construction, and arrangement of the parts of my improved attachment without departing from its essential features and purposes, and it is my intention to cover by this application any such changes which may be included within the scope of my claim.

I claim as my invention.

In a device of the class described, an arm, means for adjustably mounting said arm on an inclined shank for securing said arm in different positions around the shank, said arm being inclined upwardly and away from the shank, a journal device, means for adjustably mounting said journal device on said arm for permitting rotary adjustment of the journal device, a shaft in said journal device, and a disk on said shaft, whereby said first means may be adjusted rotatably around the shank for varying the position of the disk with relation to the path of travel of the machine, and so that said last described means may be arranged for regulating the position of the disk with relation to upright position in all adjustments of said first means.

Des Moines, Iowa. November 16, 1916.

CHARLES H. GARDINER.

Copies of this patent may be obtained for five cents each, by addressing the "Commissioner of Patents, Washington, D. C."